United States Patent [19]

Tateoka et al.

[11] 4,100,838
[45] Jul. 18, 1978

[54] VACUUM AUGMENTATION DEVICE

[75] Inventors: Kiyoshi Tateoka, Fujisawa; Hiromi Ando, Tokyo; Tomizo Azuma, Yamato, all of Japan

[73] Assignee: Tokico Ltd., Kawasaki, Japan

[21] Appl. No.: 748,321

[22] Filed: Dec. 7, 1976

[30] Foreign Application Priority Data

Dec. 13, 1975 [JP] Japan .................. 50-148598

[51] Int. Cl.² .................. F15B 9/10; F01B 31/12
[52] U.S. Cl. .................. 91/1; 91/369 B
[58] Field of Search .................. 91/369 B, 1

[56] References Cited

U.S. PATENT DOCUMENTS

| | | | |
|---|---|---|---|
| 2,900,962 | 8/1959 | Ingres | 91/369 B |
| 2,949,892 | 8/1960 | Ayers, Jr. | 91/369 B |
| 3,026,853 | 3/1962 | Stelzer | 91/369 B |
| 3,906,836 | 9/1975 | Wilson | 91/369 B |

*Primary Examiner*—Paul E. Maslousky
*Attorney, Agent, or Firm*—Schmidt, Johnson, Hovey & Williams

[57] ABSTRACT

A vacuum augmentation device for use with a vehicle braking system and of the type having a body, a diaphragm-piston mechanism providing a pair of fluid chambers in the body, valving for isolating or communicating the chambers, a push rod actuated plunger assembly for operating the valving, an output rod shiftably mounted in the body and carrying a fulcrum plate, and a number of reaction levers for effecting a lever type coupling between the diaphragm-piston mechanism, the shiftable plunger assembly and the fulcrum plate on the output rod is provided with improved structure for coupling the reaction levers with the diaphragm-piston mechanism, which structure employs a mounting plate member engaged with the mechanism and carrying on the opposite side thereof an elongate fulcrum pin for each reaction lever which is longitudinally engageable with the latter in line contacting relationship to provide a radially fixed fulcrum for each of the reaction levers. The improved structure facilitates assembly of the device, provides for retention of the fulcrum pins against dropping out, and establishes the kind of radially fixed, line contact fulcrums necessary to prevent material change in the augmentation ratio with wear.

7 Claims, 5 Drawing Figures

VACUUM AUGMENTATION DEVICE

BACKGROUND OF THE INVENTION

This invention relates to a fluid pressure-operated servomotor and more particularly, to a reaction means for a vacuum augmentation device suitably employed as the power source for operating the master cylinder of a vehicular fluid pressure-operated brake device.

A great variety of vacuum augmentation devices have been proposed and practically operated and one of the prior art vacuum augmentation devices generally comprises the main body which is divided into two air-tight chambers by means of a diaphragm - piston unit and includes a valve mechanism which shifts by the operation of a plunger which responds to the operation of an input rod. In the conventional vacuum augmentation device referred to hereinabove, the valve mechanism normally communicates between the two chambers under a low pressure (negative pressure) and when the brake force is applied, one of the chambers is communicated with the atmosphere to produce a differential pressure between the two chambers to thereby generate an additional brake application force which acts on the piston. The additional brake application force is transferred from the diaphragm - piston through a reaction lever to the piston of a master cylinder. In the above-mentioned conventional vacuum augmentation device, the force receiving portion which is adapted to transfer the additional brake application force is integrally formed with the power piston which is formed of, for example, synthetic resin, and in consequence, the force receiving portion is formed a part of the power piston. Therefore, the conventional vacuum augmentation device has the disadvantage that the contact faces of the power piston and reaction lever prematurely wear away because the contact faces on the two parts frictionally engage and in consequence, the force receiving portion varies or can not be maintained in a predetermined fixed position resulting in unevenness in the functioning of the vacuum augmentation device.

In order to eliminate the disadvantage inherent in the vacuum augmentation device referred to hereinabove, an improved vacuum augmentation device has been developed as shown in Japanese Patent Publication No. 13148/1973. In this vauum augmentation device, the power piston is rotatably engaged by needle-like rollers and the reaction lever is normally in line contact with the needle-like rollers.

Although this device of Japanese Patent Publication has eliminated the disadvantage inherent in the conventional vacuum augmentation device referred to hereinabove to some extent, the needle-like roller-type device has presented a new problem. That is, in order that the needle-like roller-type device can function satisfactorily, it is required that the grooves receiving the needle-like rollers allow some radial play, so that the rollers can rotate within a predetermined angular range, and this fact causes the fulcrum of the reaction lever to become unstable and uncertain. In addition to the disadvantages inherent in the needle-like roller-type device, the device has the further disadvantages that the rollers tend to drop out of the retention grooves and that the augmentation ratio fluctuates or the hysteresis tends to increase.

SUMMARY OF THE INVENTION

Therefore, the purpose of the present invention is to provide a vacuum augmentation device which can effectively eliminate the disadvantages inherent in the prior art devices referred to hereinabove.

According to the present invention, there have been provided a vacuum augmentation device in which an additional brake force acting on a piston is transferred, through pins formed of wire held on a metal mounting plate member interposed between the piston and a reaction levers, to the reaction levers; and pawls adapted to hold the pins in predetermined positions are formed on the mounting plate member at a plurality of points thereof, each pawl being formed in such a manner that, for instance, three sides defining a rectangle are stamped out and the remaining side is further bent up so as to make it substantially at right angles to the plane of the plate member and thereby forming a hole in the plate member adjacent to the thus formed pawls so that the presence and/or any condition of the pin can be confirmed.

The above and other objects and attendant advantages of the present invention will be more readily apparent to those skilled in the art from a reading of the following detailed description in conjunction with the accompanying drawings which show one embodiment of the invention for illustration purpose only, but not for limiting the scope of the same in any way.

PREFERRED EMBODIMENT OF THE INVENTION

Figure 1:
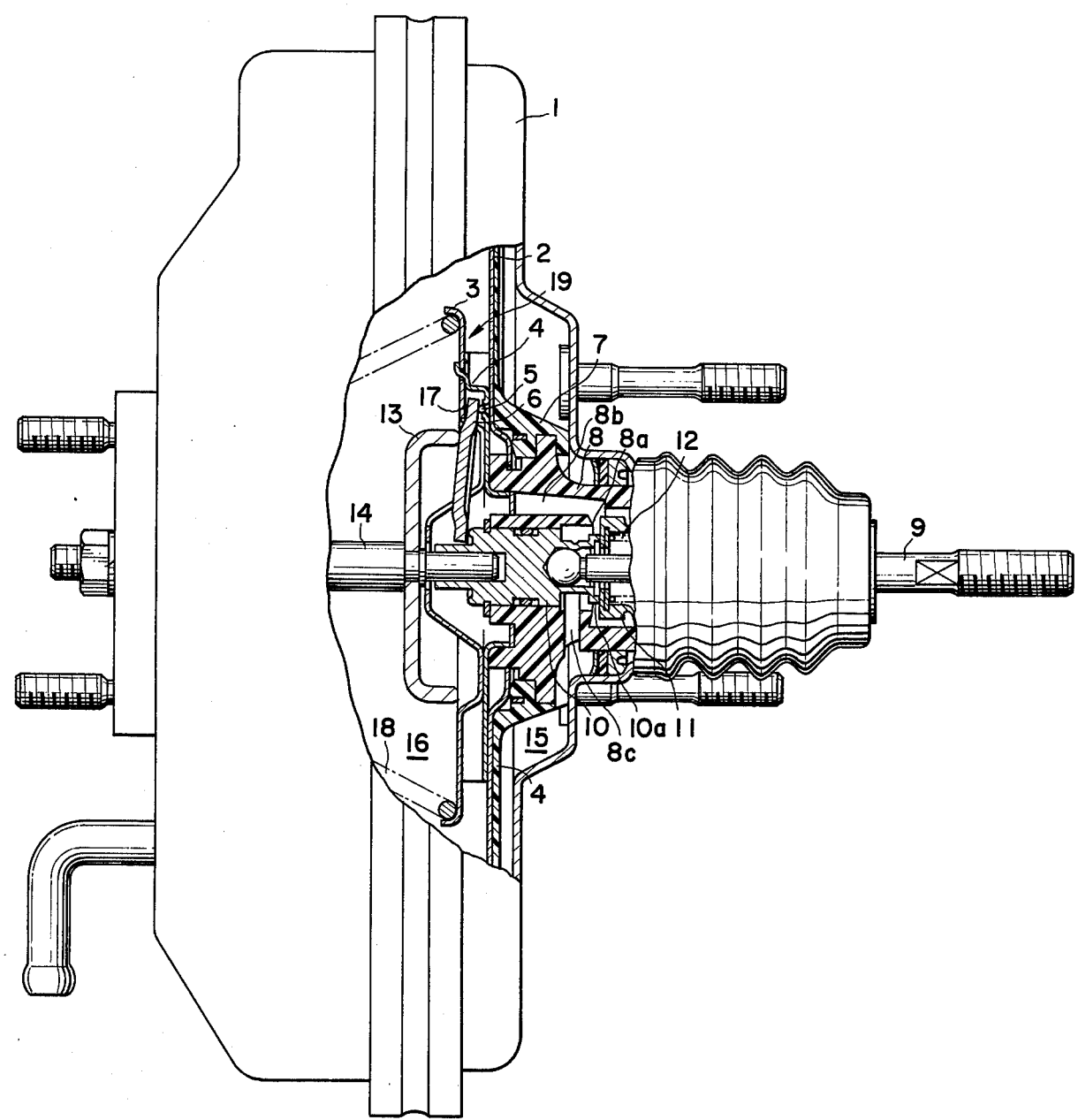
FIG. 1 is an elevational view of a brake booster comprising one preferred embodiment of vacuum augmentation device of the present invention showing a portion thereof in section.

The present invention will be now described referring to the accompanying drawings which show one preferred embodiment of vacuum augmentation device of the invention for illustration purpose. The operation principle of the vacuum augmentation device according to the invention is substantially similar to that of the conventional vacuum augmentation devices. That is, as is well known in the art, when the vehicle driver steps on the vehicle brake pedal, a leftward thrust is imparted to the input rod 9 (as seen in FIG. 1) in response to the stepping action of the driver. The thrust acting on the input rod 9 moves the plunger 10 secured to the rod 9 leftwards (as seen in FIG. 1) within the valve body 8 by a predetermined distance. Simultaneously, the poppet valve 11 which is biased leftwards by the spring 12 until the poppet valve abuts against the valve seat 10a on the plunger 10 moves leftwards to abut against the valve seat 8a on the valve body 8 whereupon the communication between the front chamber 16 in which a low pressure (negative pressure) is normally maintained and the rear chamber 15 which is normally in communication with the front chamber 16 through passages 8b and 8c and the atmosphere is interrrupted. Thereafter, as the input rod 9 further moves leftwards, the valve seat 10a on the plunger 10 separates from the corresponding seating face on the poppet valve 11 whereby air from the atmosphere is allowed to pass through the passage 8c into said rear chamber 15 thus generating a differential pressure between the rear and front chambers 15, 16 on the opposite sides of the diaphragm 7 to thereby initiate the augmentation force operation.

The additional brake force induced by the differential pressure is transferred through the piston 2 to the reaction lever unit 19 from which the force is further transferred to the fulcrum plate 13 and then to the output rod 14.

The reaction lever unit 19 shown generally comprises an annular plate member 4, a plurality of equally and angularly spaced substantially U-shaped pins 5, a cover 3 and a plurality of equally and angularly spaced substantially triangular reaction levers 6 (the number of the reaction levers 6 corresponds to that of the pins 5). In the reaction lever unit 19 shown, since the annular mounting plate member 4 abuts against the piston 2 and each reaction lever 6 abuts at the inner end or apex of the lever on one side thereof against the plunger 10 and in an intermediate position between the apex and the outer end or bottom of the lever on the other side thereof against the fulcrum plate 13, the additional brake force from the piston 2 is transferred to the mounting plate member 4, to the pins 5 secured to the plate member 4, to the reaction levers 6 which rock about the pins 5 as the fulcrums, and to the master cylinder (not shown) in the order mentioned.

When the brake pedal is released from the stepping force imposed thereon by the vehicle driver, the poppet valve 11 assumes the position as shown in FIG. 1 and the rear and front chambers 15, 16 on the opposite sides of the diaphragm 7 communicate with each other, but the communication of these chambers with the atmosphere is interrupted whereupon the reaction lever unit 19 and piston 2 are returned to their initial positions under the action of the return spring 18 anchored to the cover 3 as in the case of the conventional vacuum augmentation devices.

Figure 2:
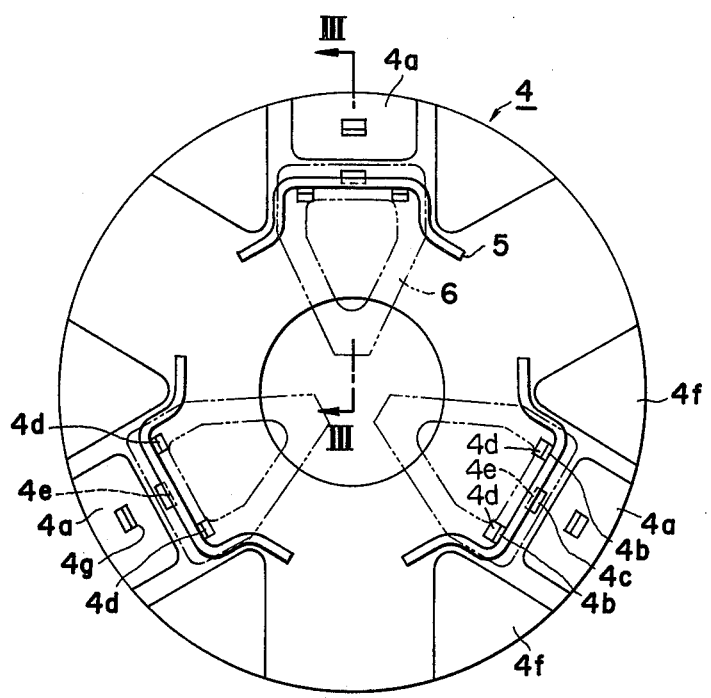
FIG. 2 is a plan view of the inner face of the mounting plate member of the reaction lever unit of said vacuum augmentation device of FIG. 1 showing the plate member together with certain parts mounted thereon.
Figure 3:
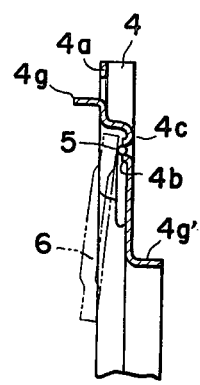
FIG. 3 is a cross-sectional view taken along substantially the line III — III of FIG. 2.
Figure 4:
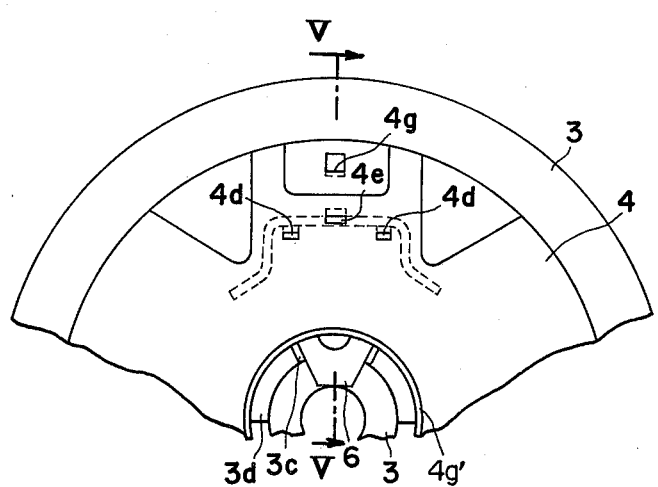
FIG. 4 is a fragmentary view of the outer face of the mounting plate member with the cover in place.

FIG. 2 is a plan view of the mounting plate member, pin and reaction lever assembly 4, 5 and 6 of the reaction lever unit 19 and FIG. 3 is a cross-sectional view taken substantially along the line III — III of FIG. 2. The mounting plate member 4 is formed of an annular metal plate and has an annular inner flange 4g' which engages the valve body 8 and which is formed by bending the metal plate at the inner periphery thereof in one direction or the righthand direction as seen in FIGS. 1 and 3.

The mounting plate member 4 further has three equally and angularly spaced substantially rectangular convexes or hollow bosses 4a which are positioned adjacent to the outer periphery of the mounting plate member and which project from the plate member proper in the direction opposite from the flange 4g' or in the left-hand direction as seen in FIG. 3. A pawl or projection 4g is provided substantially in the center of each of the convexes 4a projecting out of the convex and the pawl 4g is formed by stamping out the center of the associated convex 4a and then bending the stamped-out portion outwardly substantially at right angles to the plane of the convex 4a (see FIGS. 2 and 3). A pair of substantially triangular convexes or hollow bosses 4f are also provided on the mounting plate member 4 on the same side of the plate member where the convexes 4a are provided. Each pair of the triangular convexes 4f are positioned adjacent to and spaced from the opposite sides of the associated convex 4a and extend from the plane of the plate member proper by the same height as the convexes 4a. The triangular convexes 4f extend radially and inwardly from the outer periphery of the mounting plate proper by a distance greater than the convexes 4a with the pieces of the triangular convexes directed towards the center of the plate member for the purpose to be described hereinafter.

A three-point lever retention means are provided spaced radially and inwardly from the respectively associated convex 4a and comprises three pawls or projections 4b, 4b and 4c provided in a triangular arrangment on the side of the plate member proper where the convexes 4a and 4f are provided, that is, the two pawls 4b, 4b are positioned at spaced points in a straight line and the pawl 4c is positioned in an intermediate position between the pawls 4b, 4b in a line parallel to and spaced from the line in which the pawls 4b, 4b are positioned whereby the pawls 4b, 4b, 4c are arranged in a staggered relationship. A pin 5 formed of a hard wire is retained in the fulcrum portion thereof between the pawls 4b on one hand and the pawl 4c on the other hand. The pawls 4b, 4b and 4c are also formed by stamping out the annular plate at the appropriate areas of the latter and then bending the stamped-out areas substantially at right angles to the plane of the plate proper. The height of the pawls 4b, 4c is selected to be smaller than the diameter of the pins 5 and the distance between the line where the pawls 4b are positioned and the line where the pawl 4c is positioned is slightly greater than the diameter of the pins 5 and the opposite ends of each of the pins 5 extend outwardly from the associated three-point pin retention means and are bent substantially at right angles to the opposite ends of the fulcrum portion thereof and then flared outwardly along the apex of the associated triangular convex 4f whereby when the pin 5 is received between the associated pawls 4b, 4b on one hand and the pawl 4c on the other hand of the associated three-point pin retention means, the displacement of the pin 5 being restricted by the inner sides of the associated pair of triangular convexes 4f. As is more clearly shown in FIG. 2, as the result of the formation of the pawls 4b, 4c in the manner mentioned hereinabove, openings 4d and 4e are provided adjacent to the respectively associated pawls 4b, 4c by means of which whether the pins 5 are retained in the three-point pin retention means or not can be confirmed from the reverse side of the mounting plate member 4 where the annular flange 4g' is formed even after the assembly of the reaction lever unit 19 as will be described hereinbelow.

Figure 5:
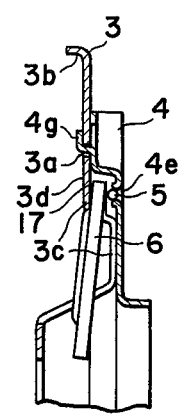
FIG. 5 is a cross-sectional view taken along substantially the line V — V of FIG. 4.

A substantially triangular reaction lever 6 is placed over each of the pins 5 with the bottom and areas adjacent to the bottom thereof riding on the fulcrum portion and areas adjacent to the fulcrum portion of the associated pin 5 and the apex of the lever extending over the center opening in the mounting plate member 4. A circular cover 3 is applied over the side of the mounting plate member 4 where the convexes 4a, 4f, pawls 4b, 4c, 4g, pins 5 and reaction levers 6 are provided and has three equally and angularly spaced openings 3a adjacent to the outer periphery thereof through which the pawls 4g extend, an annular outer peripheral flange 3b against which the return spring abuts is formed by bending the outer periphery of the mounting plate member 4 at substantially right angles to the plane of the mounting plate member proper in said side of the plate member, three equally and angularly spaced openings 3c through which the leg portions of the triangular reaction levers 6 loosely extend and abutment portions 3d defined between the respectively associated openings 3a and 3c against which the bottoms and areas adjacent to the bottoms of the triangular reaction levers 6 abut whereby the reactions levers 6 are held in position. After the pawls 4g have been inserted through the respectively corresponding openings 3a in the cover 3, the pawls are bent radially and outwardly to abut against the outer side of the cover 3 to thereby assemble the mounting plate member 4 and cover 3 together into a unitary structure. Since the outward displacement of the reactions pins 6 is limited by the convexes 4a and 4f, the reaction levers 6 are each permitted to rock only in the leftward and rightward directions (as seen in FIG. 5) about a portion of the periphery of each of the pins 5 as the fulcrum. A clearance 17 is defined between the cover 3 and each of the reaction levers 6 as shown in FIG. 1 and the depth of the clearance 17 is designed smaller than the height of the pawls 4b, 4c after the pawls have been bent against the cover 3. Furthermore, since the outwardly flared extreme ends of the pins 15 are pinched between the mounting plate member 4 and the abutment faces 3d of the cover 3, even the reaction levers 6 rock about the pins 5 as the fulcrums, the pins 5 can be positively prevented from coming off between the pawls 4b, 4c.

With the above-mentioned construction and arrangement of the parts of the vacuum augmentation device of the present invention, since the fulcrums for the reaction levers 6 are formed by the pins 5 formed of the hard wires which are held substantially stationarily, the fulcrums are not displaceable and the wear of the pins can be minimized to assure a relatively long service life for the pins whereby there is no variation in the force augmentation ratio. And according to the present invention, the pins are not held by pistons as in the prior art vacuum augmentation device, but by the rigid metal mounting plate 4 and accordingly, the reaction lever and pin can be assembled together as a unitary reaction lever - pin unit in a single processing step which makes the assembly of the components of the vacuum augmentation device easy resulting in reduction of the production cost of the entire vacuum augmentation device. Furthermore, the reaction lever - pin unit has the advantage that the unit can be used with equal effect in brake boosters having different sizes. Still furthermore, the presence and/or any defects of the pins 5 can be easily seen through the openings 4d, 4e provided as the result of the formation of the pawls 4b, 4c in the manner as mentioned hereinabove to thereby eliminate the possibility of mis-assembling of the parts.

While only one embodiment of the invention has been shown and described in detail it will be understood that the same is for illustration purpose only and not to be taken as a definition of the invention, reference being had for this purpose to the appended claims.

What is claimed is:

1. A vacuum augmentation device of the type usable with a push rod actuated vehicle braking system and having
    a hollow body,
    a plunger assembly shiftably mounted in said body and actuatable by said push rod for movement of said plunger assembly from a standby to an operated position thereof in response to actuation of said push rod,
    an output rod shiftably mounted in said body to be moved with augmented force in response to movement of said plunger assembly to its operated position,
    a shiftable diaphragm-piston mechanism mounted in said body between a pair of fluid chambers within the latter,
    means for subjecting one of said chambers to a fluid pressure different from atmospheric pressure,
    valve means operably associated with said plunger assembly for placing said chambers in communication with each other to maintain both of said chambers at substantially the same fluid pressure when said plunger assembly is in its standby position, and for isolating said chambers from fluid communication with each other and placing the other of said chambers in communication with the atmosphere for shifting said diaphragm-piston mechanism in response to the fluid pressure differential presented between said chambers when said plunger assembly is moved to its operated position,
    a generally cup-shaped fulcrum plate mounted on said output rod for transmitting a force to the latter for moving the same and having an edge portion generally concentric with the axis of said output rod and facing in a direction generally toward said plunger assembly and said diaphragm-piston mechanism,
    a number of reaction levers extending generally radially with respect to the axis of said output rod, each having a pair of oppositely facing side surfaces, and each disposed with a radially inner portion of one of said surfaces engageable by said plunger assembly and a radially intermediate portion of the other of said surfaces engageable with said edge portion of said fulcrum plate,
    and means for operably coupling a radially outer portion of said one surface of each reaction lever with said diaphragm-piston mechanism,
the improvement of which is characterized by said coupling means including:
    a mounting plate member extending between said radially outer portion of said one surface of each reaction lever and said diaphragm-piston mechanism and in engagement with the latter;
    an elongate fulcrum pin for each reaction lever; and
    pin retention means formed on said mounting plate for each pin respectively for holding the latter in disposition for longitudinal, substantially line contact of an intermediate portion of said pin between its ends with said radially outer portion of said one surface of the corresponding reaction lever.

2. The vacuum augmentation device as set forth in claim 1, in which said mounting plate member comprises an annular metal plate having a plurality of equally and angularly spaced substantially rectangular convexes provided on one side thereof adjacent to the outer periphery of the plate member and a pair of substantially triangular convexes provided on said one side thereof adjacent to and spaced from the opposite sides of each of said rectangular convexes with the apex of each triangular convex directed toward the center of said plate member, said pin retention means being positioned radially inwardly of each of said rectangular convexes and laterally spaced from said pair of triangular convexes.

3. The vacuum augmentation device as set forth in claim 2, in which a generally circular cover is applied over said one side of the annular plate member to cover said rectangular and triangular convexes, pin retention means, fulcrum pins and reaction levers, said cover having three equally and angularly spaced openings adjacent to the outer periphery of the cover.

4. The vacuum augmentation device as set forth in claim 3, in which said rectangular convexes each has a pawl projecting from said one side of the annular plate member in the center of the associated rectangular convex and extending through the corresponding one of said openings in the cover with the free end of the pawl bent against the cover to thereby connect the annular plate and cover together into a unitary structure.

5. The vacuum augmentation device as set forth in claim 3, in which said rectangular and triangular convexes project from said one side of the annular plate member by the same height.

6. The vacuum augmentation device as set forth in claim 1, in which each of said pin retention means comprises at least three projections extending from the side of said plate member facing the corresponding reaction lever and positioned for engaging the corresponding fulcrum pin from opposite sides of the latter, said projections extending from said plate member a distance less than the diameter of said pin.

7. The vacuum augmentation device as set forth in claim 6, in which there are provided openings in said mounting plate adjacent said pawls for permitting visual checking of said pins from the opposite outer side of said mounting plate.

* * * * *